B. A. HOPPER.
HEADLIGHT FOR VEHICLES.
APPLICATION FILED NOV. 21, 1914.
1,142,963.
Patented June 15, 1915.
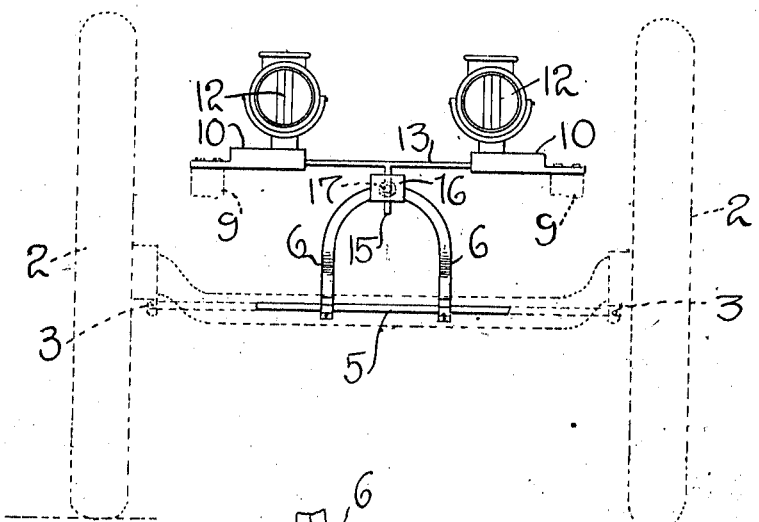
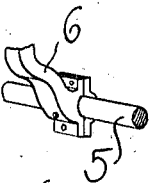
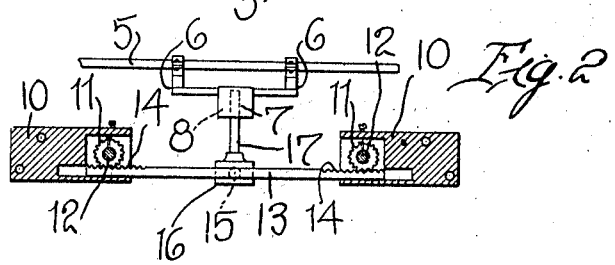
Inventor
B. A. HOPPER

UNITED STATES PATENT OFFICE.

BERT ALFORD HOPPER, OF BIG RAPIDS, MICHIGAN, ASSIGNOR OF ONE-HALF TO ROLAND MILLER FRANTZ, OF BIG RAPIDS, MICHIGAN.

HEADLIGHT FOR VEHICLES.

1,142,963.   Specification of Letters Patent.   Patented June 15, 1915.

Application filed November 21, 1914. Serial No. 873,357.

*To all whom it may concern:*

Be it known that I, BERT A. HOPPER, a citizen of the United States, residing at Big Rapids, in the county of Mecosto and State of Michigan, have invented certain new and useful Improvements in Headlights for Vehicles, of which the following is a specification, reference being had to the accompanying drawings.

This invention relates to new and useful improvements in headlights for vehicles and more particularly to an automatic headlight control, the main object of the present invention being the provision of a construction and arrangement of headlights for automobiles and vehicles of a like character, whereby the headlights are turned automatically in accordance with the angle taken by the front steering wheels of the machine, thereby causing the rays of light from the lamps to be directed in the course to be followed by the machine, in accordance with the position of the steering wheels. This insures the illumination of that part of the roadway which is being approached and which is to be traveled over, and is much more satisfactory than the present arrangement in which the headlights are fastened in fixed position on the frame or chassis of the machine.

Another object of the present invention is the provision of a device of the above character which will possess advantages in points of efficiency and durability, is inexpensive to manufacture and, at the same time, is simple in construction and operation.

With the above and other objects in view, the invention consists in the novel features of construction, combination and arrangement of parts as will be hereinafter referred to, and more particularly pointed out in the specification and claim.

Figure 1 is a front elevation illustrating a steering apparatus constructed in accordance with my invention. Fig. 2 is a top plan view illustrating parts thereof in horizontal section; and Fig. 3 is a detail perspective view illustrating the manner of securing the yoke to the steering rod.

Referring more particularly to the drawings 2 indicates the front wheels which are secured to the front axle by means of conventional knuckles. Extending laterally from the knuckles are the arms 3, the outer ends of which are pivotally connected to the transverse rod 5 of the steering mechanism. Mounted upon the steering rod, is the yoke member 6, the lower ends of which are arranged in spaced relation and are bolted or otherwise secured to the steering rod.

Mounted upon the upper central portion of the yoke 6, is a bearing block 7 having a central bore 8 extending therein, the purpose of which will be hereinafter more fully set forth.

Mounted upon the vehicle springs 9 and extending inwardly are the casings 10 which are adapted to contain the gears 11 mounted upon the lower ends of the lamp standards 12.

Extending longitudinally between the casings 10, is a bar 13, the ends of which are provided with a plurality of teeth 14 adapted for engagement with the gear 11 whereby to rotate said gears and the lamp supports upon reciprocating movement of the bar 13.

Extending downwardly from the bar 13, is a pivot rod 15, said rod extending through a transverse opening formed in the cross head 16 whereby the rod 15 will be loosely mounted within the cross head 16 so that the movement of the bar 13 up and down will not interfere with the steering mechanism.

Formed integral with the cross head 16 and extending outwardly, is a pin 17 which is adapted to project into the central bore 8 formed in the member 7 whereby to movably connect the cross head with the member 7, so that upon oscillating movement of the steering rod 5, the lamp standards 12 will be rotated through the medium of the bar 13 and the connections between the bar and the yoke 6.

It will be apparent from the foregoing that I have provided a simple and durable device whereby the lamp standards are mounted upon the forward springs of a vehicle and are so connected with the steering rod of the vehicle that the lamp standards may be rotated simultaneously with the action of the steering rod, whereby the rays from the lamps upon the standards 12 will always be turned directly in front of the vehicle whether traveling in a straight line or rounding curves. It will also be apparent that my improved steering apparatus can be quickly and readily applied to any well known form of motor vehicle or removed, if desired. It will also be noted that my improved steering apparatus can be manufactured and placed upon the market at a comparatively low cost.

While I have shown and described the preferred form of my invention, it will be obvious that various changes in the details of construction and in the proportions may be resorted to for successfully carrying my invention into practice, without sacrificing any of the novel features or departing from the scope of the invention, as defined by the appended claim.

Having thus described this invention, what I claim is:—

A device of the class described including a steering rod, a yoke mounted thereon, a block supported at the upper end of the yoke, having a central bore therein, lamp supports arranged in spaced relation upon opposite sides of the yoke, gears carried by the supports, a bar having teeth upon each end adapted to engage with the gears, a cross head, means forming a movable connection between the cross head and the bar, a pin carried by the cross head and adapted to be inserted within the bore of the block whereby the lamp supports will be rotated upon the actuation of the steering rod.

In testimony whereof I hereunto affix my signature in the presence of two witnesses.

BERT ALFORD HOPPER.

Witnesses:
ARTHUR J. MARTZ,
R. M. FRANTZ.